(12) United States Patent
Jirskog

(10) Patent No.: US 7,589,664 B2
(45) Date of Patent: *Sep. 15, 2009

(54) CIRCUIT FOR MULTIFREQUENCY BAND RADAR LEVEL GAUGE

(75) Inventor: Anders Jirskog, Huskvarna (SE)

(73) Assignee: Rosemount Tank Radar AB, Gothenburg (SE)

( * ) Notice: Subject to any disclaimer, the term of this patent is extended or adjusted under 35 U.S.C. 154(b) by 14 days.

This patent is subject to a terminal disclaimer.

(21) Appl. No.: 10/518,889

(22) PCT Filed: Jul. 8, 2003

(86) PCT No.: PCT/SE03/01192

§ 371 (c)(1), (2), (4) Date: Sep. 6, 2005

(87) PCT Pub. No.: WO2004/005960

PCT Pub. Date: Jan. 15, 2004

(65) Prior Publication Data

US 2006/0012512 A1   Jan. 19, 2006

Related U.S. Application Data

(60) Provisional application No. 60/394,369, filed on Jul. 8, 2002.

(51) Int. Cl.
  *G01S 13/08* (2006.01)
  *G01F 23/284* (2006.01)
(52) U.S. Cl. .................. 342/124; 342/83; 324/644; 73/290 R
(58) Field of Classification Search .............. 342/124
  See application file for complete search history.

(56) References Cited

U.S. PATENT DOCUMENTS

| 4,661,817 A | 4/1987 | Bekkadal et al. ............ 342/124 |
| 4,665,403 A | 5/1987 | Edvardsson ................. 342/124 |

(Continued)

OTHER PUBLICATIONS

"Introduction to Radar Systems", by Merrill I Skolnik, pp. 559-566, 1962.

(Continued)

*Primary Examiner*—Thomas H Tarcza
*Assistant Examiner*—Matthew M Barker
(74) *Attorney, Agent, or Firm*—Westman, Champlin & Kelly, P.A.

(57) ABSTRACT

A circuit for a radar level gauge for measuring the level of the surface of a product stored in a container, wherein the gauge includes a radar for transmitting microwave signals from a multiband antenna unit towards the surface for receiving microwave signals reflected by the surface and for determining the level based on an evaluation of the time lapsed between the received and the transmitted signals and said radar operating on at least two different frequency bands. The circuit includes: a first microwave provision means for providing a microwave signal of a first frequency band having a first center frequency, a second microwave provision means for providing a microwave signal of a second frequency band having a second center frequency. The ratio between the second and the first center frequency is quantified as at least greater than 1.5:1 and preferably greater than 2:1. Switches are operated by means of a control signal for switching the circuit to operate on said first frequency band or said second frequency band.

13 Claims, 2 Drawing Sheets

U.S. PATENT DOCUMENTS

| | | | |
|---|---|---|---|
| 4,820,970 A | 4/1989 | Swanson | 324/640 |
| 4,901,245 A * | 2/1990 | Olson et al. | 702/54 |
| 5,287,329 A * | 2/1994 | Ikeda | 367/91 |
| 5,406,842 A * | 4/1995 | Locke | 73/290 R |
| 5,578,933 A * | 11/1996 | Nonaka | 324/639 |
| 5,651,286 A | 7/1997 | Champion et al. | 73/290 |
| 5,659,321 A | 8/1997 | Burger et al. | 342/124 |
| 6,026,307 A * | 2/2000 | Blom et al. | 455/118 |
| 6,081,241 A | 6/2000 | Josefsson et al. | 343/771 |
| 6,130,637 A * | 10/2000 | Meszaros et al. | 342/124 |
| 6,150,890 A * | 11/2000 | Damgaard et al. | 331/14 |
| 6,166,681 A * | 12/2000 | Meszaros et al. | 342/124 |
| 6,255,983 B1 * | 7/2001 | Meszaros et al. | 342/124 |
| 6,293,142 B1 * | 9/2001 | Pchelnikov et al. | 73/290 R |
| 6,300,897 B1 * | 10/2001 | Kielb | 342/124 |
| 6,598,473 B2 * | 7/2003 | Atkinson | 73/290 V |
| 6,606,053 B2 | 8/2003 | Fehrenbach et al. | 342/124 |
| 6,621,278 B2 * | 9/2003 | Ariav | 324/637 |
| 6,672,155 B2 * | 1/2004 | Muller et al. | 73/290 V |
| 6,684,696 B2 * | 2/2004 | Schultheiss | 73/290 V |
| 6,768,317 B2 * | 7/2004 | Moller et al. | 324/637 |
| 7,053,630 B2 * | 5/2006 | Westerling et al. | 324/644 |
| 2002/0020216 A1 | 2/2002 | Schultheiss | 73/290 V |
| 2002/0059828 A1 * | 5/2002 | Muller et al. | 73/290 R |
| 2002/0101373 A1 * | 8/2002 | Arndt et al. | 342/124 |
| 2002/0135508 A1 * | 9/2002 | Kleman | 342/124 |
| 2003/0025630 A1 | 2/2003 | Fehrenbach et al. | 342/124 |

OTHER PUBLICATIONS

"Radar Handbook", by Merrill I. Skolnik, Ch. 7 p. 52, Ch. 11 p. 2, Ch. 26 pp. 27-28, (1970).

"Radar Handbook", Second Addition by Merrill I. Skolnik, Ch. 9, pp. 16-18, (1990).

"Microwave Surface Level Monitor", Stanley S. Stuchly et al., pp. 85-92, (1971).

Radars vol. 6, "Frequency Agility and Diversity" by David K. Barton, pp. 13, 22, 311, and 401, (1977).

S. Stuchly et al., "Microwave Surface Level Monitor,", IEEE Transactions on Industrial Electronics and Control Instrumentation, vol. IECI-18, No. 3, Aug. 1971.

\* cited by examiner

CIRCUIT FOR MULTIFREQUENCY BAND RADAR LEVEL GAUGE

CROSS-REFERENCE TO RELATED APPLICATION

The present application is a Section 371 National Stage Application of International patent application Serial No. PCT/SE2003/001192, filed Jul. 8, 2003, and published in English as WO 2004/005960, the content of which is hereby incorporated by reference in its entirety.

TECHNICAL FIELD

The present invention relates to level measurement in industrial processes, wherein the invention is used for measurement of product level in a storage tank of the type used in industrial applications using a microwave level gauge. More specifically, the present invention relates to a circuit for providing the radar level gauge with microwaves optionally operating on at least two different frequency bands and a method for the generation of said different microwave frequency bands.

BACKGROUND OF THE INVENTION AND RELATED ART

There is known in the art to measure the level of the surface of a product stored in a tank by means of a radar level gauge. Such devices are disclosed in a number of documents. As an example of such a document, it will here be referred to patent document U.S. Pat. No. 4,665,403.

Radar level gauges for use, as an example within the processing industry, must be able to function under very different conditions. The product stored could be a lot of different products, such as petroleum refinery products, liquid gases and other chemical compounds. This implies that such parameters as temperature and pressure can be of very shifting values. Disturbing structures are also existing inside the tank. Such are, for example, devices as agitators, foam, etc., whereby measuring is rendered more difficult and may go wrong.

Three technical problems are recognized from this: 1° various structures inside the tank give disturbing radar echoes, 2° it is desirable to have an antenna creating a narrow antenna beam (among other to suppress disturbing echoes), 3° various propagation influences (dirt on the antenna, foam on a liquid product surface etc.) may reduce the desired echo greatly but in worst case leave the disturbing echoes. These problems are partly known in radar history (see for instance Merill I Skolniks 3 books Radar Systems 1962, Radar Hbk 1970 and Radar Hbk 1990—all from McGraw Hill). Typically a low radar frequency (up to 3 GHz) is used for long range surveillance systems (100 km and more) while a high radar frequency (10 GHz and higher), where rain etc. may limit the measuring range, are used for high precision navigation, fire control etc. at rather small distances (a few km).

In connection with level gauging in tanks there may be quite a number of disturbing echoes. The disturbing echoes from the surroundings, either if the echoes come from structures in a tank, or in the field of air traffic control, from ground echoes interfering with an echo from an aircraft, will limit the ability to detect or measure the desired echo among the many undesired ones. One standard solution to decrease the influence of such undesired interference for a pulse radar, as an example, is to let the transmitter frequency jump around within a band of a few 100 MHz to over 1 GHz. The use of these small frequency jumps within a radar band is normally called "frequency agility" (see chapter 9.7 in Skolniks Radar Hbk from 1990 or DK Bartons book "Frequency agility and diversity" from Artech House 1977). Multiple frequencies are also used in CW radars both as a frequency modulated CW radar, FMCW (using a range of frequencies) and multiple frequency CW radar, MFCW (for instance described in Skolniks book Radar Systems from 1962). MFCW radar has also been described for liquid level gauging ("Microwave surface level monitor" by Stanley Stuchley in IEEE trans. on industrial electronics, August 1971 and in patent document NO 831198). A frequency agility pulsed radar for level gauging is suggested in published patent document U.S. 2002/0020216.

For a radar level gauge used in a tank the situation is in many ways different from an outdoor radar and the following conditions should especially be mentioned.

A) The tank geometry and structure may give many disturbing echoes, whereby normally a narrow beam is desirable, but on the other hand the mounting possibilities in the tank (the size of the already existing mounting hole) generally limit the available space for the antenna, which preferably should be big to give a narrow microwave beam from the antenna.

B) Another important factor is that many liquids or tank conditions creates a foam layer on the liquid or a layer of dirt on the antenna. Due to the special dielectric properties of water, wet dirt, especially, may give a disastrous limitation of the propagation already at a few tenths of a mm wet dirt or a foam layer with the corresponding water content.

C) The frequency bands used for level gauging are for the time being around 6 GHz (related to the ISM band at 5.8 GHz), around 10 GHz and around 25 GHz (related to the ISM-band at 24.5 GHz). Nearly all radar level gauges are operated in closed metallic tanks and at low power so the leakage of electromagnetic power can be kept within current rules in spite of the need for a rather big bandwidth as compared to for instance the width of the ISM-bands.

D) Typical for a radar level gauge is further that the surface not always moves. The surface echo may thus be mixed with fixed echoes from tank structures and a possibly destructive interference at certain frequencies may persist for a long time. At a pulse radar, a way to decrease such effects is to use more than one frequency which is a closely related reason to use frequency agility in standard radars. As comparison an FMCW radar sweeps over a range of frequencies thus avoiding said problem.

The installation conditions (such as foaming state etc.) are in many cases not well known as the tank may be old or not possible to open due to high pressure or extreme temperature in the tank, poisonous content etc.

The very diversified needs have created a number of different radar level gauges on the market among them 3 groups of gauges using frequencies around 6, 10 and 25 GHz. In all three cases typically 10% bandwidth is used both in case of an FMCW system and a pulsed system (in which case the bandwidth is determined by the pulse length). To illustrate the range of differences the lobe-width for the same antenna diameter is around 4 times bigger at 6 GHz compared to 25 GHz, while the attenuation through the same layer of dirt or foam corresponds to 4 times longer measuring distance at 6 GHz as compared to 25 GHz, given the same sensitivity. With the same measure, the possible range at 6 GHz is around two times the range at 6 GHz, given the same layer of dirt and the same antenna size. A 25 GHz radar level gauge is in practical cases not usable in combination with dirt and foam. The actual conditions may in practical cases be hard to know in advance so a change of gauge to one using another frequency frequently occurs.

The problems mentioned may be compensated for by use of more than one radar level gauge, where each of them can measure at a different frequency band. Such a solution is of course not wanted as it makes the system expensive and many times not possible to install in a tank.

Document U.S. Pat. No. 5,659,321 shows an example of a radar level gauge system enabling level measurements on two different microwave frequencies. This is achieved by the use of a radar level module and a frequency converter for allowing the same radar level module to be used also at the higher frequency. The choice of the frequency band is made at the installation of the radar level gauge in the tank and makes it possible to adapt the radar characterics to the conditions prevailing in the tank, which depends on type of tank or of the kind of material being stored in the tank. The type of antenna installed is matched to the choiced frequency. It is not possible by means of the disclosed system to change the frequency continuously or to change the frequency in dependence of varying conditions in the tank during normal operation of the radar level gauge system.

SUMMARY OF THE INVENTION

According to one aspect of the invention, there is presented a two-wire powered radar level gauge having the features of the independent device claim.

According to a second aspect of the invention, there is presented a method for radar level gauging having the features of the independent method claim.

The circuit according to the present invention is simple an advantageous to use in an FMCW radar. It is simple to tap off the wanted frequency.

It is possible to use circuits by starting from a microwave source having a low frequency signal, whereby the signal is converted to higher frequencies. This method gives a low phase noise, but a rather narrow bandwidth.

Another possibility to arrive at multiple microwave frequencies is to start with a high frequency microwave signal, whereby this signal is converted down in one or more steps. This method renders a higher noise, but a better bandwidth than the mentioned method of converting the signal to higher frequencies.

According to the invention, there is thus provided a radar level gauge for measuring the level of a surface of a product stored in a tank by use of a radar, where said radar transmits microwaves towards said surface and receives microwaves reflected by said surface and wherein said radar is adapted to transmit and receive said microwaves within two widely separated frequency bands. Widely separated frequency bands are chosen to utilize the differences in attenuation due to foam on the surface and the differences in beam-width or other disturbances. The ratio between the center frequencies of the two frequency bands can be quantified as at least greater than 1:1.5 or preferably greater than 1:2.

Still, according to the invention, said radar level gauge is coupled to a multiband antenna. Said antenna could be any antenna having broad band performance. Preferred antennas are those from the group consisting of: a wide band horn antenna, a helix antenna, a patch array multiband antenna.

One advantage with the level gauge according to the invention is that it is possible to measure the surface level of a product by use of switching between different frequencies bands. Thus it will not be necessary to change the level gauge equipment operating on a certain frequency band to another level gauge equipment operating on another frequency band that is better suited for the conditions prevailing in the tank. It will also be possible to perform the level gauging by measurements on more than one frequency band for the same product in the tank. This may be performed by an automatic switching between the available frequency bands, whereafter the results of the measurements performed at different frequency bands may be compared and analysed for a determination of the most accurate value of the level of the surface of the product inside the tank.

One further advantage with a radar level gauge according to the invention aspect is that a signal received from the radar can be made more advanced and analyzed by means of a comparison of different spectra. Judgements of which echo from the surface of the product in the tank that is the most accurate and which echoes that may be disregarded as disturbance echoes are made available by the present invention.

EMBODIMENTS OF THE INVENTION

A number of embodiments of the present invention supported by the enclosed figures will be disclosed in the following.

Figure 1:
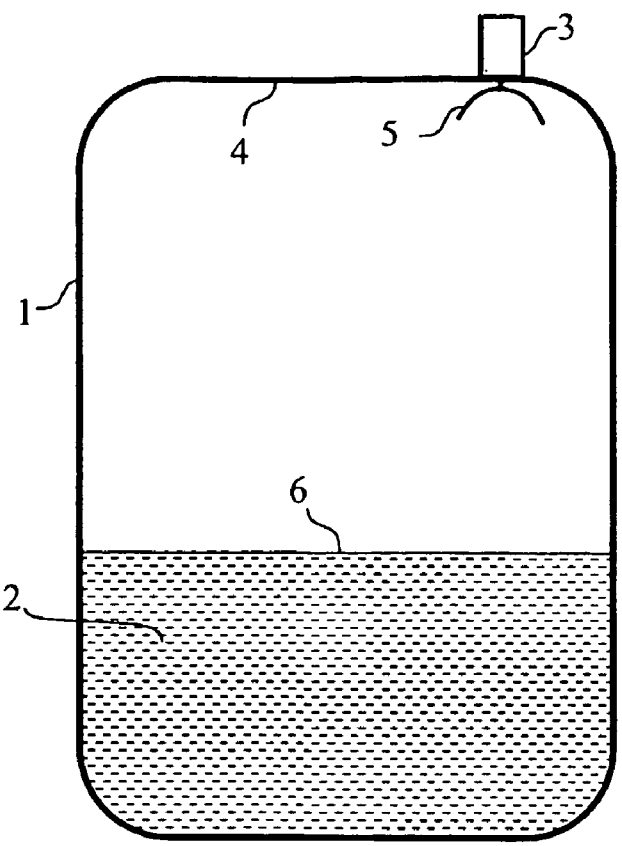
FIG. 1 shows a schematic view of a tank in which a product is stored and where a radar level gauge is arranged at the roof of the tank for measuring the level of the surface of the product.

An application of a radar level gauge is shown in FIG. 1. A tank 1 is used for storing a product 2. The product may be such as oil, refined products, chemicals and liquid gas, or may be a material in powder form. A radar 3 is attached to the roof 4 of the tank 1. A microwave beam is transmitted from the radar via an antenna 5 at the interior of the tank. The transmitted beam is reflected from the surface 6 of the product and is received by the antenna 5. By means of a comparison and evaluating of the time lap between transmitted and reflected beam in a measuring and controlling unit, a determination of the level of the product surface 6 in a known manner is performed. The microwave may be transmitted from the antenna as a free radiated beam or via a wave guide (not shown), which communicates with the product. The radar level gauge as shown in FIG. 1 is only used as an example.

Figure 2:
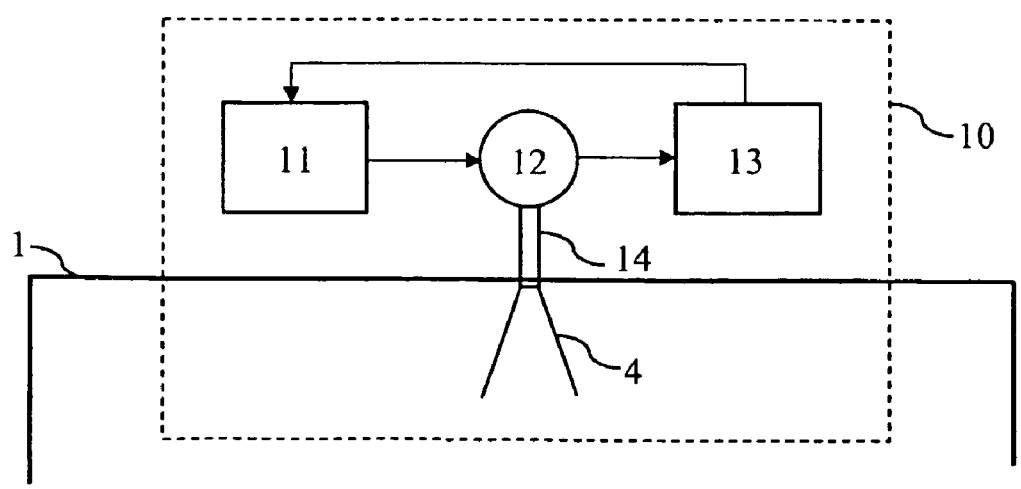
FIG. 2 shows a view of an arrangement of a radar level gauge according to the present invention.

According to the invention a level gauge operating on a multiple of frequencies is disclosed. An example of a radar level gauge (10) according to the invention is schematically illustrated in FIG. 2. The level gauge of FIG. 2 is composed by building blocks, which will be described below.

A control unit 11 is controlling an RF module 12. Said control unit 10 is thus controlling the switching between the different frequencies on which the RF module may operate.

The RF module 12 is generating the microwave signal for transmitting and receiving the microwaves into and from the tank as described. The signal received is transformed to a low frequency signal, which is digitalized and analyzed in a signal analyzing unit 13. In the signal analyzer 13 the received signal is analyzed on the frequencies of which the level gauge is transmitting. From the analysis it is then decided in the signal analyzer on which frequencies the level gauge will be operated. A control signal with information about the chosen frequency is sent from the signal analyzer 13 to the control unit 11, which controls the frequency switching of the RF module 12. In the signal analyzer 13 there is also an evaluation unit, for calculation of the product surface level 6 in a conventional way. The different echo spectra received from the at least two different frequency bands are analysed in this evaluation unit for determining the level of the surface in the tank and for being the basis of the analysis of which calculated value being the most accurate as described above. Upon this analysis the evaluation unit will adopt the level gauging system to use only one of the frequency bands for determining the accurate value or to use the values from the at least two different frequency bands by use of any averaging calculation method.

The distribution of the microwave signal between the RF module 12 and the antenna 4 is accomplished by means of a transmission line 14. Said transmission line can be provided by means of a coaxial wire or by any type of a wave guide. Particularly appropriate for use as a wave guide is a ridge wave guide, as such a wave guide has the bandwidth that is necessary in this application. A conventional ridge wave guide can not be used without structural changes as it must be sealed for use in a tank. Hence, in this embodiment the ridge wave guide is adapted to level gauging requirements by sealing the wave guide to withstand pressure differences between the inside and the outside of a tank wall. Further, the surfaces of the ridge wave guide inside the tank wall can be provided with surface layers which can stand possible contamination. One preferred surface layer is polished PTFE, which is difficult to wet.

The RF module for generating microwaves can be operated according to any radar principle for distance measuring such as the FMCW modulation principle or according to any pulsed system. The generation of microwaves may be arranged for 2 frequency bands or for any number n of frequency bands.

As the antenna 4, any broadband antenna for microwaves may be used but many conventional wide band type antennas are not suited for use in the tough tank environment with its requirement for sealing, problems with dirt etc. The antenna must be mounted via a lead-through in the tank wall. Wide band horn antennas may be used in any of different designs, either as normal probe feeded horns or, as mentioned, as so called ridge wave guides, which have extremely large bandwidth. A ridge wave guide can further be arranged for working in both one or two polarizations. Such a horn can be connected to the RF module 12 via a connection for the ridge wave guide in the RF module. This is an advantage as a good seal for the tank can be provided inside the wave guide. An explosion tight cladding may further be provided for in the casing for the electronics. Another alternative is to connect the horn antenna to the RF module via a micro strip feeder or any type of TEM-line corresponding to a coaxial line (TEM is a common name for all cables with two or more leaders irrespective of the cross-section of the cable).

The antenna is a typical and very critical component in a multiband radar level gauging system. Beside of the normal antenna function (as described in antenna textbooks) it must fulfill all the following three requirements pressure sealing, sealing surface to withstand a layer of dirt, condensation etc and be usable over the two or more bands typical in the present described system. As an example of a typical antenna for this purpose, a ridge horn antenna which (as compared to its standard counterpart) is filled and sealed with a dielectric sealing such as PTFE and shaped towards the tank atmosphere to avoid destructive condensation, i.e. as a basically conical shape which is polished.

Another type of antennas that can be used for the purpose are helix antennas as these antennas are frequency independent. A log-periodic antenna or a Yagi antenna are also possible candidates, where the log-periodic antenna typically covers several frequency bands. Still one more type of antennas that can be used for the purpose are patch array antennas for multiple bands. An antenna of this type can be designed in such a way that two frequency bands with two different center frequencies may be achieved.

Different radar techniques may be used for accomplishing a multiband radar solution for use in the application as disclosed in the invention. An FMCW radar as well as a pulsed radar system could be used as there are no differences between those systems, in principle, with regard to the present application. In the following, there is described one example of a radar using an FMCW radar system for operation on two different frequency bands according to the present invention. A block diagram showing said disclosed example is enclosed in FIG. 3 and is referred to herein by use of reference numbers. The enclosed example discloses a radar for use on the frequency bands 6 and 24 GHz. This is only shown as an illustrative example and must not be seen as any limit for use of any other method to compose the blocks of a radar system, the use of available frequency bands and the use of different radar techniques.

A detailed description of the included electronic blocks will not be made here as the use of the blocks are known in the art.

Figure 3:
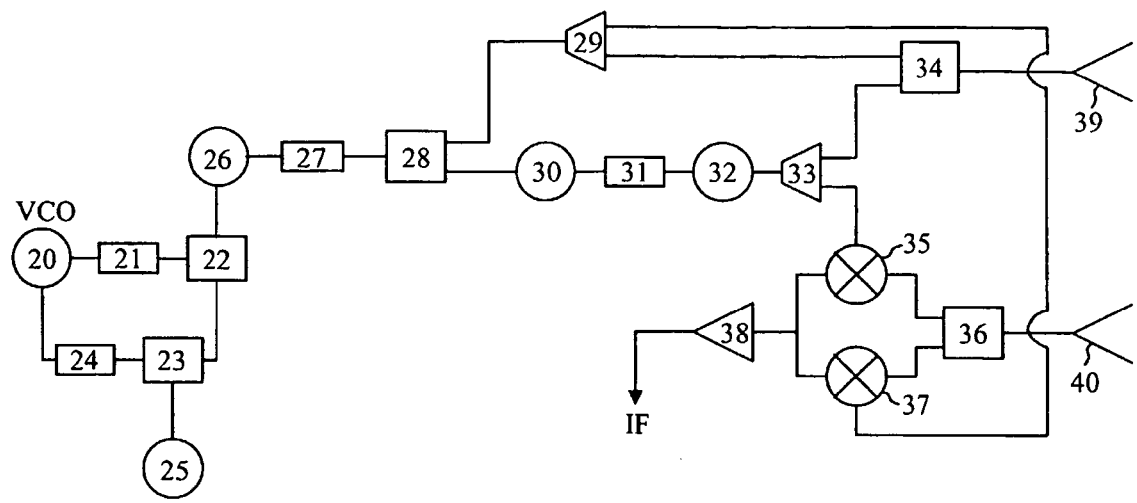
FIG. 3 is showing a schematic block diagram of one example of an FMCW radar system for operation on two different frequency bands.

In FIG. 3 a preferred embodiment of a circuit according to the invention is disclosed. A microwave frequency source is established by means of blocks 20 to 25. In these blocks number 20 denotes a voltage controlled oscillator, VCO. The VCO generates a microwave frequency with a bandwidth at the output in the range of 2900 Mhz-3350 MHz. The signal at the output of VCO 20 is attenuated in a first attenuator 21. After the attenuation the signal is forwarded to a directional coupler 22, where a portion of the signal is reflected back in a loop containing a phase locked loop 23. The Phase-Locked Loop (PLL) 23 is a closed loop frequency control system, the functioning of which is based on a phase sensitive detection of phase difference between an input signal from a fixed oscillator 25 and the output signal of the voltage controlled oscillator (VCO) 20. In the loop a low pass filter 24 is included.

The signal from the output of the microwave source is sent to a first multiplier 26, wherein the frequency of the microwave in this specific example is multiplied by 2, which means that the frequency available is now on the 6 GHz band. The microwave is then further attenuated in a second attenuator 27 and being forwarded to a first switch 28. The function of the circuit is here first described with the switches of the circuit being set for use of the 6 GHz band. To achieve this, the switches are set in the a) positions indicated in the figure. The microwave signal from the first switch is distributed to a first power divider 29, wherein one portion of the signal (T) is directed to the transmitting antenna 39 by passing a second switch 34. A second portion of the microwave signal (R) is distributed from said first power divider 29 to a first mixer 37. An echo signal is received by the receiving antenna 40 and guided through a third switch 36 to said first mixer, whereby an intermediate frequency signal IF is obtained according to known theories. Said IF signal is amplified in an IF amplifier 38. The IF signal is then distributed to the analyser 13 comprising analysing and evaluation units as described.

If the switches of the circuit are set in the b) positions the complete circuit will operate on a second frequency. In this case, the microwave signal is once again, after the output from attenuator 27, directed to a multiplier, a second multiplier 30, whereby in this specific example, the frequency of the microwave signal is multiplied by two, thus providing a microwave on the 12 Ghz frequency band at the output of the second multiplier 30. After attenuation of the signal in a third attenuator 31, the signal is a third time distributed to a multiplier 32, which now brings the frequency of the microwave signal up to 24 Ghz, whereby the radar is now operating on the 24 GHz band.

One portion of the 24 GHz microwave signal provided by a second power divider 33 is now brought to the second switch 34 and due to the b) position of the second switch the microwave signal is distributed to the transmitter antenna 39. The other portion of the signal provided at the second power divider 33 is sent to a second mixer 35, where said other portion of the microwave signal is mixed with the echo signal guided through the third switch 36 from the receiving antenna 40. Out from the mixer 35 an intermediate frequency microwave IF is obtained. Said IF signal is amplified in IF amplifier 38, whereby the IF signal is output for analysing and evaluation as earlier mentioned.

In the description above the antenna unit is referred to as a transmitting antenna 39 and a receiving antenna 40, respectively. These two functions may, of course, be united into one antenna unit, which performs both the transmitting and receiving functions.

Further, it is of course possible to use other frequencies from the circuit of the present invention than those described. As an alternative, it is possible, for example, to use the 12 GHz microwave signal prevailing at the output of the second multiplier 30, instead, or as a complement to the 24 GHz signal. If said 12 GHz signal would be used as a complement, a further power divider, mixer and other switches must be used to allow for three different frequencies to be chosen. To add one more multiplier or to use multipliers with higher multiplying factors give possibilities to arrive at even higher microwave frequencies, if desired.

The switches are controlled by a control signal that switches all of the switches simultaneously. The control signal can be sent from a controller in a control room, for example initiated by an operator, or it can be programmed to be sent from the above mentioned analyser upon conditions stated in software.

A pulsed radar may be realized for achieving a corresponding function by substituting the VCO and the Phase Locked Loop (PLL) 23 with an oscillator with a fixed frequency and pulse circuits.

The invention claimed is:

1. A radar level gauge for measuring the level of a surface of a product stored in a container, said level gauge including:
   an antenna unit for transmitting microwave signals towards said surface and for receiving microwave signals reflected by said surface,
   a measuring and controlling unit for determining the level based on an evaluation of the time lapsed between the transmitted and the received signals,
   a radar module connected to said antenna unit, for generating microwave signals on at least two different frequency bands,
   said radar module including:
      a microwave generating source for providing a first microwave signal of a first frequency band having a first center frequency,
      at least one frequency multiplier coupled between said microwave generating source and said antenna unit for providing a second microwave signal of a second frequency band having a second center frequency,
      wherein the ratio between the second and the first center frequency is at least 1.5, and
      switches operated by means of a control signal for switching the radar module to operate on said first frequency band or said second frequency band, and
   a signal analyzer for analyzing the received signals on the frequencies transmitted by the antenna, and, based on analysis of the received signals, deciding on which frequencies the radar module will be operated, and generating said control signal.

2. The radar level gauge according to claim 1, wherein the radar module further includes:
   a number of first switches for the choice of an operating frequency (fo,mfo) to be delivered to the antenna unit,
   a number of mixers for mixing the microwave signal received from the antenna unit with the chosen operating frequency for the forming of an IF-frequency,
   a number of second switches for directing the microwave operating frequency to a mixer corresponding to the operating frequency and
   the choice of operating frequency for the circuit is made by a control signal controlling the switches.

3. The radar level gauge according to claim 2, including:
   a chain of at least two frequency multipliers coupled in series between the source and the antenna unit.

4. The radar level gauge according to claim 3, including:
   each one of said multiplier multiplying the input microwave frequency by a predetermined constant.

5. The radar level gauge according to claim 2, wherein said microwave generating source includes a voltage control oscillator VCO.

6. The radar level gauge according to claim 5, wherein said microwave generating source includes a phase looked loop.

7. The radar level gauge according to claim 1, wherein said switches comprise a switch for selectively connecting said first or said second microwave signal to said antenna.

8. The radar level gauge according to claim 1, further comprising:
   a first and a second mixer connected to receive the reflected microwave signal from the antenna unit, for forming an intermediate frequency (IF) signal,
   a first power divider for directing a portion of said first microwave signal to said first mixer,
   a second power divider for directing a portion of said second microwave signal to said second mixer.

9. The radar level gauge according to claim 8, wherein said switches comprise a switch for connecting a selected one of said mixers to said antenna unit.

10. The radar level gauge according to claim 1, wherein the ratio between the second and the first center frequency is at least 2.

11. A method for measuring the level of the surface of a product stored in a container by means of a radar level gauge, wherein said level gauge includes a radar for transmitting microwave signals from a multiband antenna unit towards said surface for receiving by said same antenna unit microwave signals reflected by said surface and for determining the level based on an evaluation of the time lapsed between the received and the transmitted signals and said radar operating on at least two different frequency bands, comprising the steps of:
   using a microwave generating source for providing a first microwave signal of a first frequency band having a first center frequency, multiplying, in at least one frequency multiplier coupled between said microwave generating source and said antenna unit, said first microwave signal for providing a second microwave signal of a second frequency band having a second center frequency, wherein the ratio between the second and the first center frequency is at least 1.5, providing said radar with switches for switching the radar to operate on said first frequency band or said second frequency band, analyzing the received signals on the frequencies transmitted by the radar level gauge, based on said analysis, deciding on which frequencies the radar level gauge will be operated, and controlling said switches by means of a control signal to operate said radar level gauge on said selected frequencies.

12. The method according to claim 11, further comprising the step of:

generating a microwave having a fixed frequency $f_0$, multiplying in said at least one frequency multiplier said fixed frequency $f_0$ by a factor m for obtaining a frequency $m\,f_0$ being the factor m higher than said fixed frequency, choosing by means of controlling a number of first switches an operating frequency ($f_0$, $mf_0$) to be delivered to the antenna unit, directing the microwave operating frequency to a mixer corresponding to the operating frequency, mixing the microwave signal received from the antenna unit with the chosen operating frequency for the forming of an IF-frequency and selecting an operating frequency for the circuit by means of said control signal controlling said switches.

13. The method according to claim 11, wherein the ratio between the second and the first center frequency is at least 2.

* * * * *

UNITED STATES PATENT AND TRADEMARK OFFICE
CERTIFICATE OF CORRECTION

PATENT NO. : 7,589,664 B2 Page 1 of 1
APPLICATION NO. : 10/518889
DATED : September 15, 2009
INVENTOR(S) : Anders Jirskog It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 241 days.

Signed and Sealed this

Twenty-first Day of September, 2010

David J. Kappos
*Director of the United States Patent and Trademark Office*